United States Patent
Kumar et al.

(10) Patent No.: US 11,665,526 B2
(45) Date of Patent: May 30, 2023

(54) SYSTEM AND METHOD FOR MANAGING SOR INFORMATION IN UE

(71) Applicant: Samsung Electronics Co., Ltd., Suwon-si (KR)

(72) Inventors: Lalith Kumar, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 17/274,162

(22) PCT Filed: Sep. 6, 2019

(86) PCT No.: PCT/KR2019/011593
§ 371 (c)(1),
(2) Date: Mar. 5, 2021

(87) PCT Pub. No.: WO2020/050700
PCT Pub. Date: Mar. 12, 2020

(65) Prior Publication Data
US 2021/0281995 A1    Sep. 9, 2021

(30) Foreign Application Priority Data

Sep. 7, 2018   (IN) .............................. 201841033757
Sep. 5, 2019   (IN) .............................. 201841033757

(51) Int. Cl.
*H04W 8/12*      (2009.01)
*H04W 8/18*      (2009.01)
(Continued)

(52) U.S. Cl.
CPC ............. *H04W 8/12* (2013.01); *H04W 8/183* (2013.01); *H04W 48/18* (2013.01); *H04W 84/042* (2013.01)

(58) Field of Classification Search
CPC ....... H04W 8/12; H04W 8/183; H04W 48/18; H04W 84/042; H04W 8/18
See application file for complete search history.

(56) References Cited

U.S. PATENT DOCUMENTS

2010/0322216 A1   12/2010   Roger et al.
2011/0158090 A1    6/2011   Riley et al.
(Continued)

FOREIGN PATENT DOCUMENTS

| EP | 2088723 A1 | 8/2009 |
| EP | 2520045 B1 | 7/2015 |
| WO | 2018/037126 A1 | 3/2018 |

OTHER PUBLICATIONS

European Patent Office, "Extended European Search" Report dated Aug. 11, 2021, in connection with counterpart European Patent Application No. EP 19 85 8527, 13 pages.
(Continued)

*Primary Examiner* — Wayne H Cai

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

The present disclosure relates to method for managing Steering of Roaming (SoR) information in a User Equipment (UE) (110). The method includes receiving the SoR
(Continued)

information from a Home Public Land Mobile Network (HPLMN) (107) and storing a first portion of the SoR information.

13 Claims, 7 Drawing Sheets

(51) Int. Cl.
*H04W 48/18* (2009.01)
*H04W 84/04* (2009.01)

(56) References Cited

U.S. PATENT DOCUMENTS

| | | |
|---|---|---|
| 2015/0119028 A1 | 4/2015 | Zhang |
| 2019/0190775 A1 | 6/2019 | Buckley et al. |
| 2021/0185508 A1* | 6/2021 | Buckley .................. H04W 8/06 |

OTHER PUBLICATIONS

3GPP TS 23.122 V15.4.0 (Jun. 2018) Technical Specification, 3rd Generation Partnership Project, Technical Specification Group Core Network and Terminals, Non-Access-Stratum (NAS) functions related to Mobile Station (MS) in idle mode(Release 15), Jun. 2018, 60 pages.

Intel, "Steering of Information using Secure Packet", Change Request, 3GPP TSG-SA3 (Security) Meeting SA3#92, Aug. 20-24, 2018, S3-182397, 8 pages.

NTT Docomo, et al., "Steering of Roaming for IMS emergency sessions and correction for NAS Transport for SOR", Change Request, 3GPP TSG CT Meeting #81, Sep. 10-11, 2018, CP-182176, 10 pages.

Samsung, et al., "Preferred list terminating at ME or USIM", Change Request, 3GPP TSG-CT WG1 Meeting #112, Aug. 20-24, 2018, C1-185440, 14 pages.

International Search Report dated Dec. 20, 2019 in connection with International Patent Application No. PCT/K2019/011593, 3 pages.

Written Opinion of the International Searching Authority dated Dec. 20, 2019 in connection with International Patent Application No. PCT/KR2019/011593, 5 pages.

Office Action dated Mar. 25, 2021 in connection with India Patent Application No. 201841033757, 6 pages.

* cited by examiner

[Fig. 1]
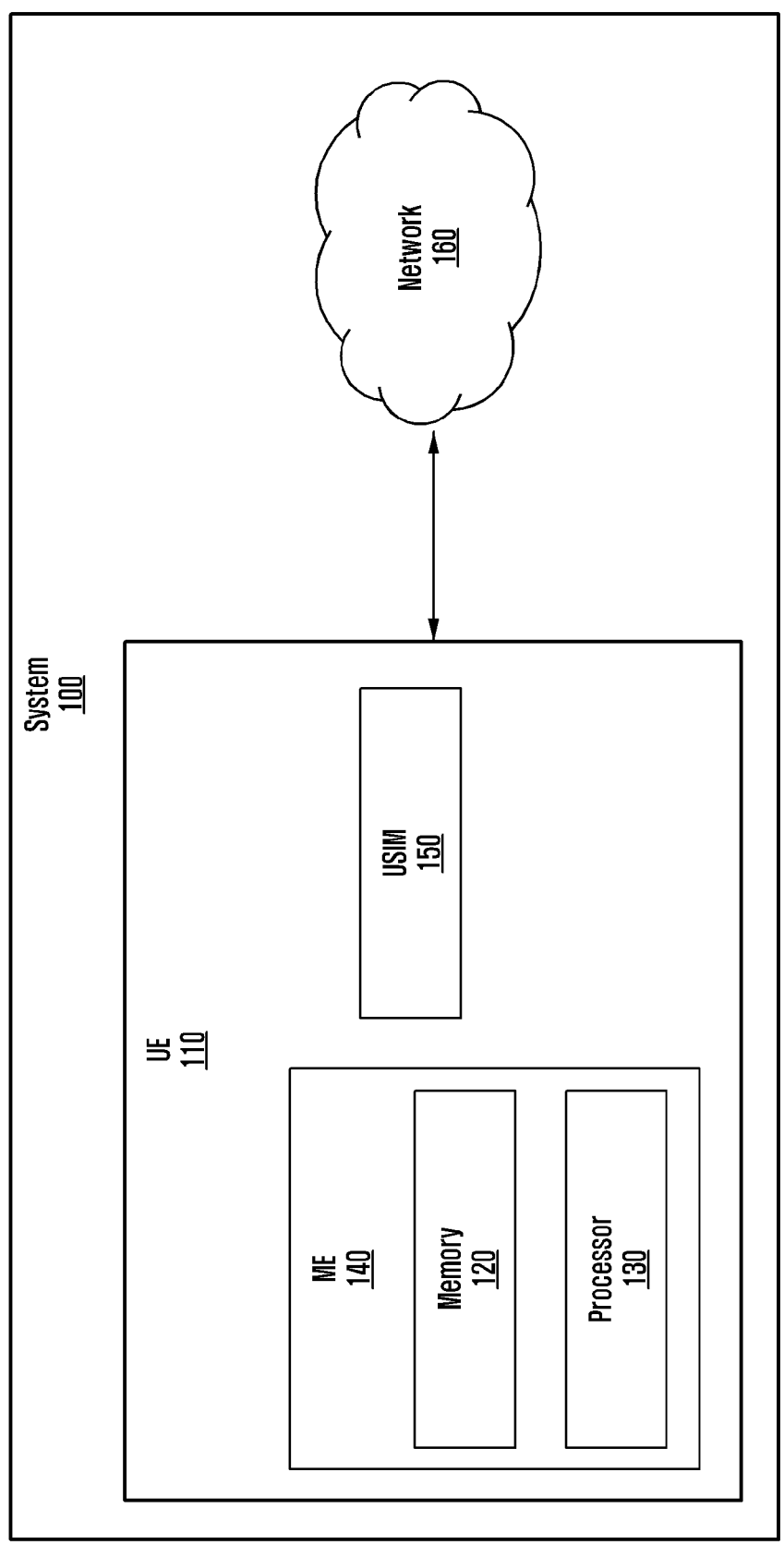

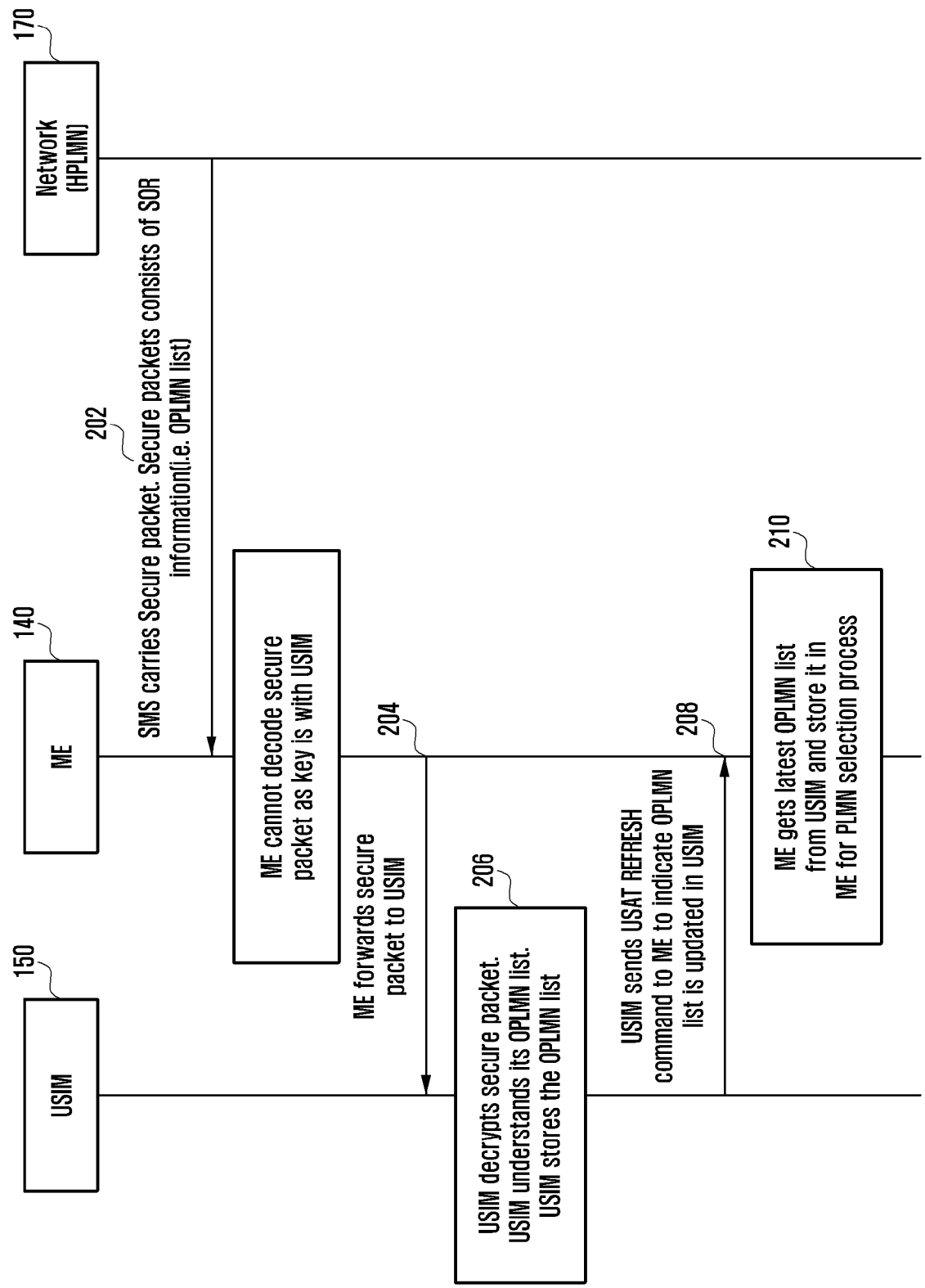
[Fig. 2]

[Fig. 3]
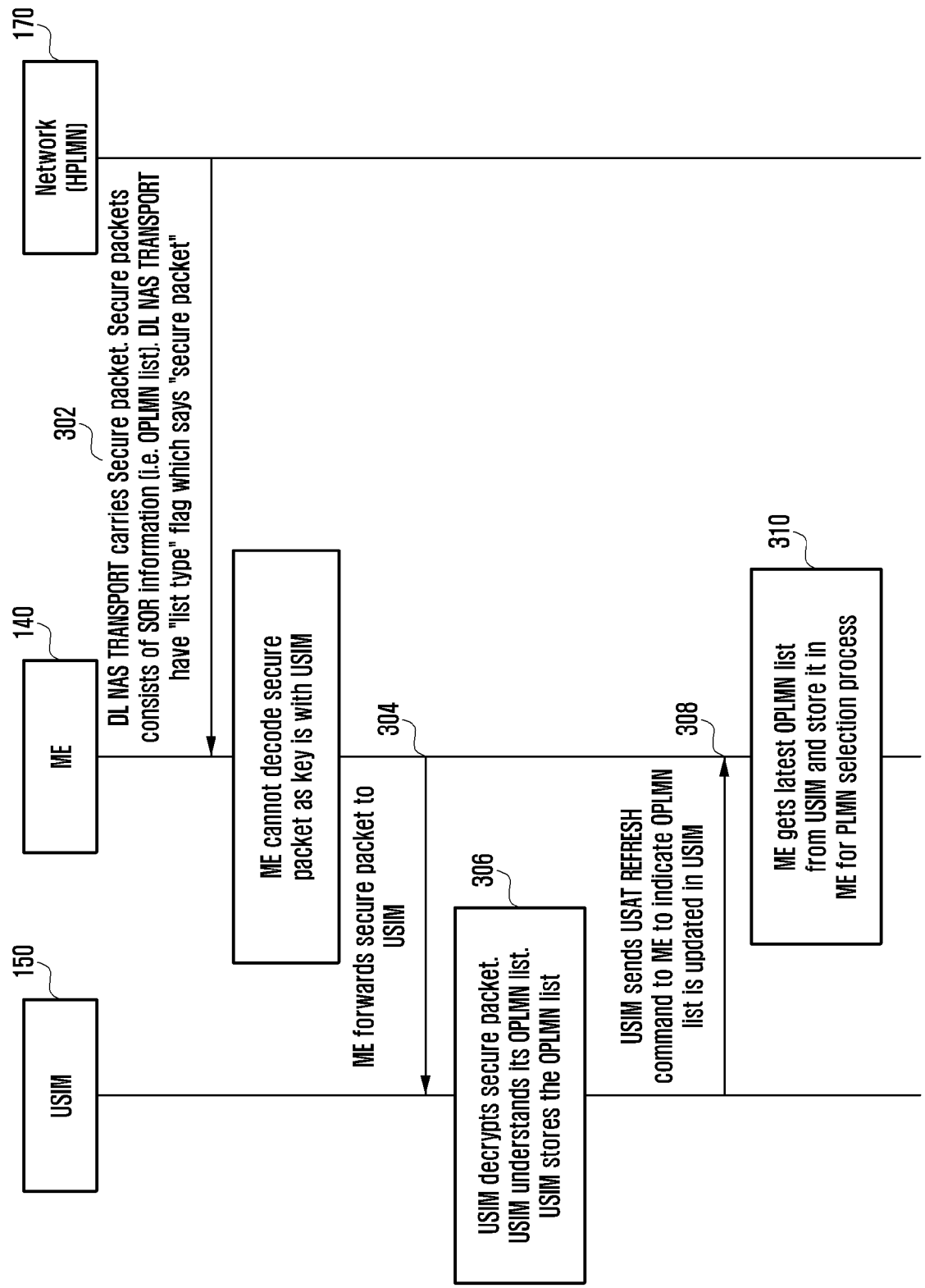

[Fig. 4]
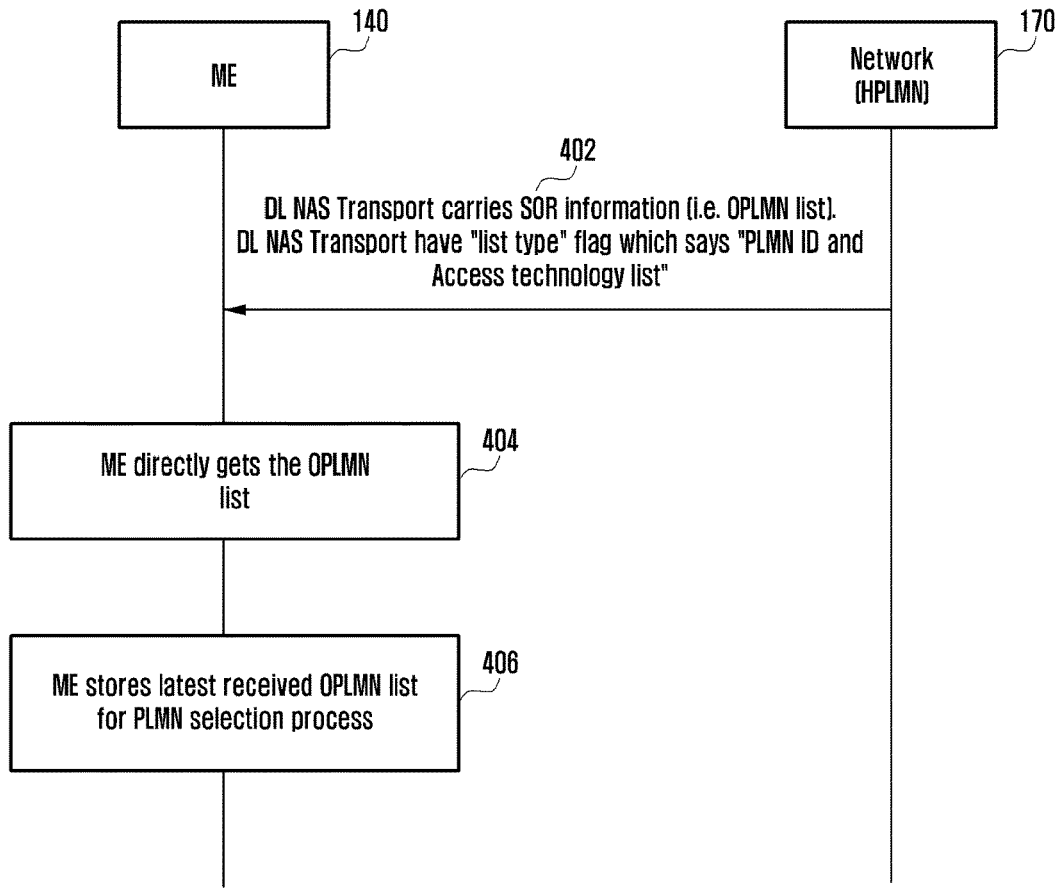
[Fig. 5]
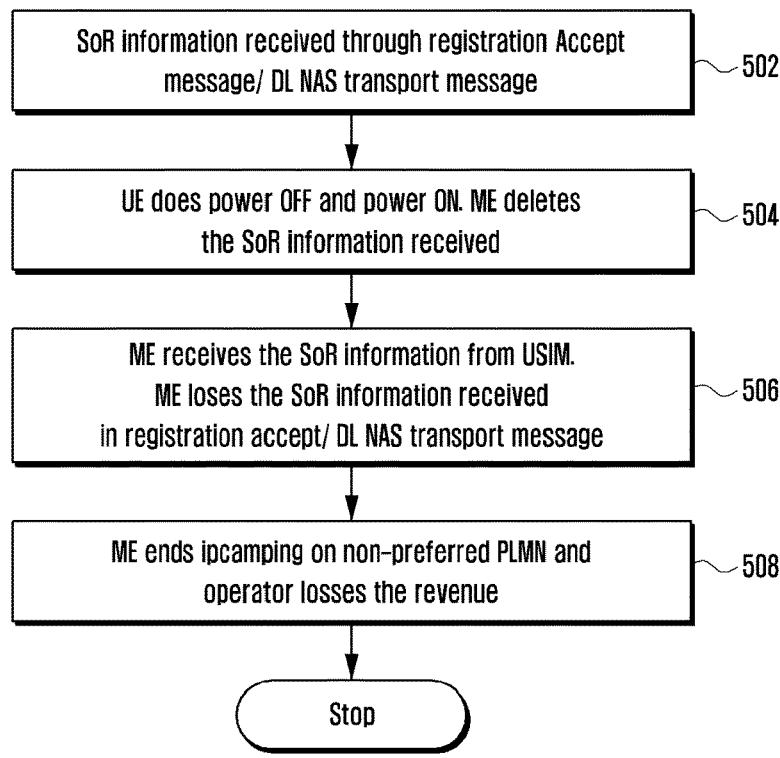

[Fig. 6]
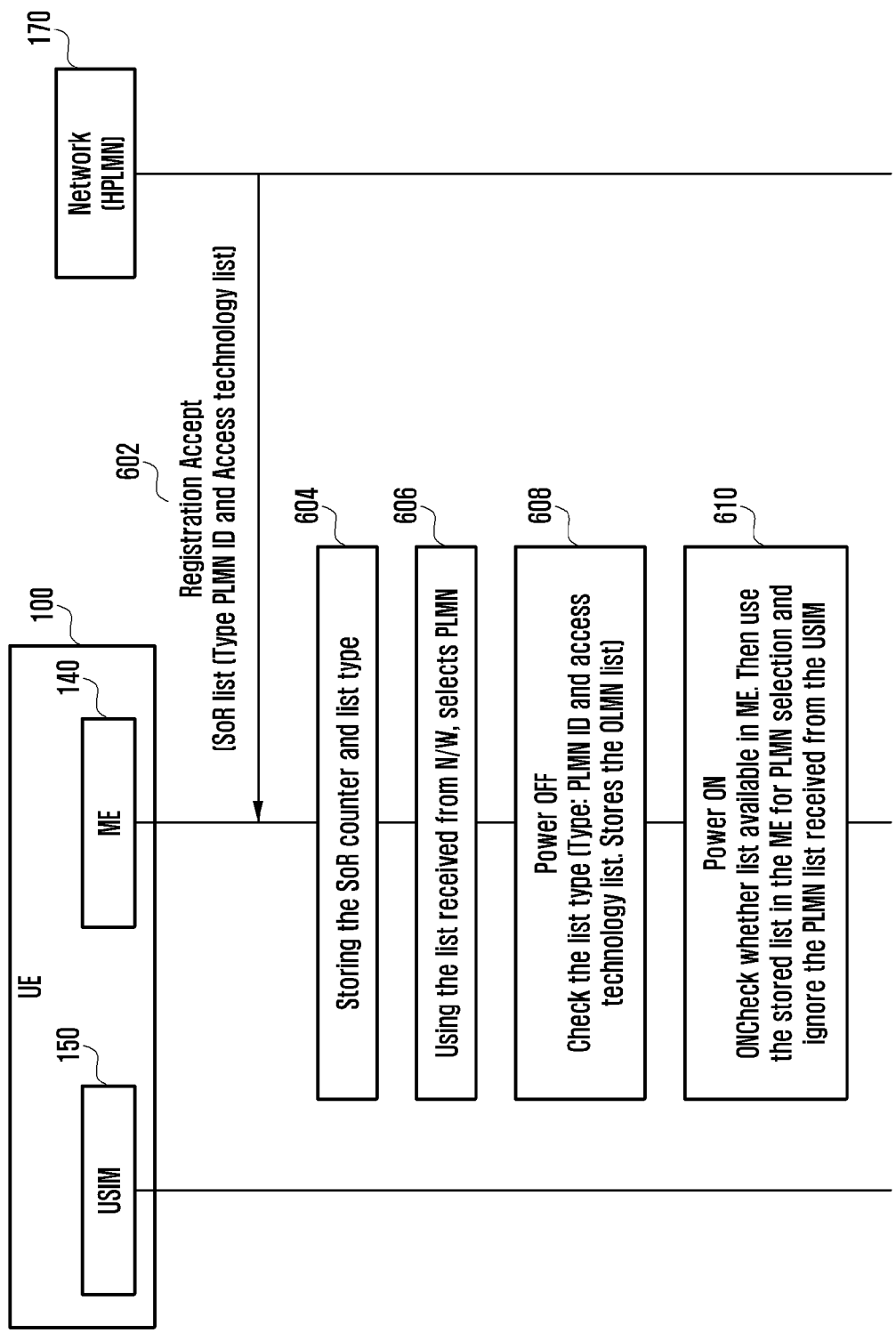

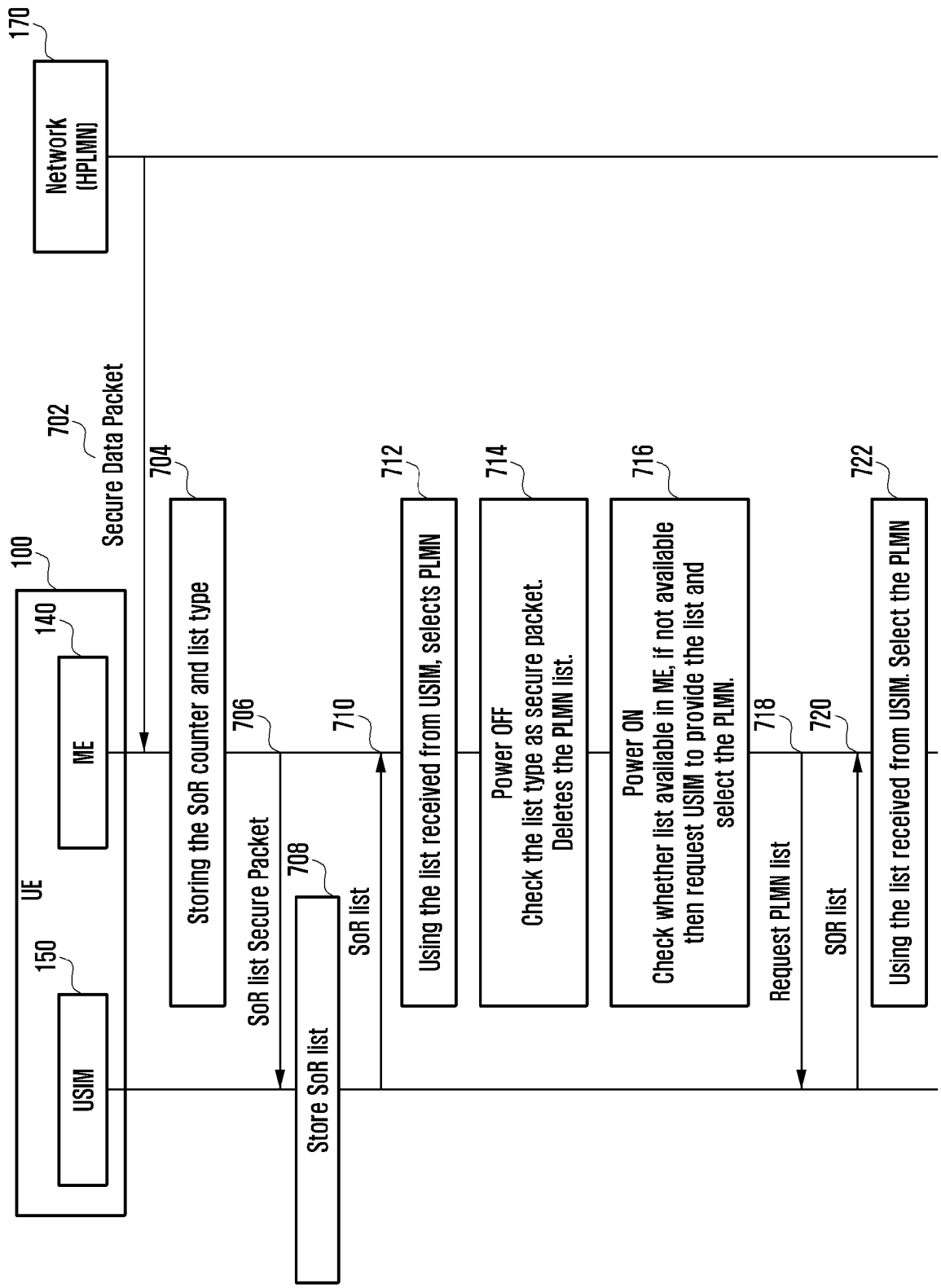

[Fig. 8]
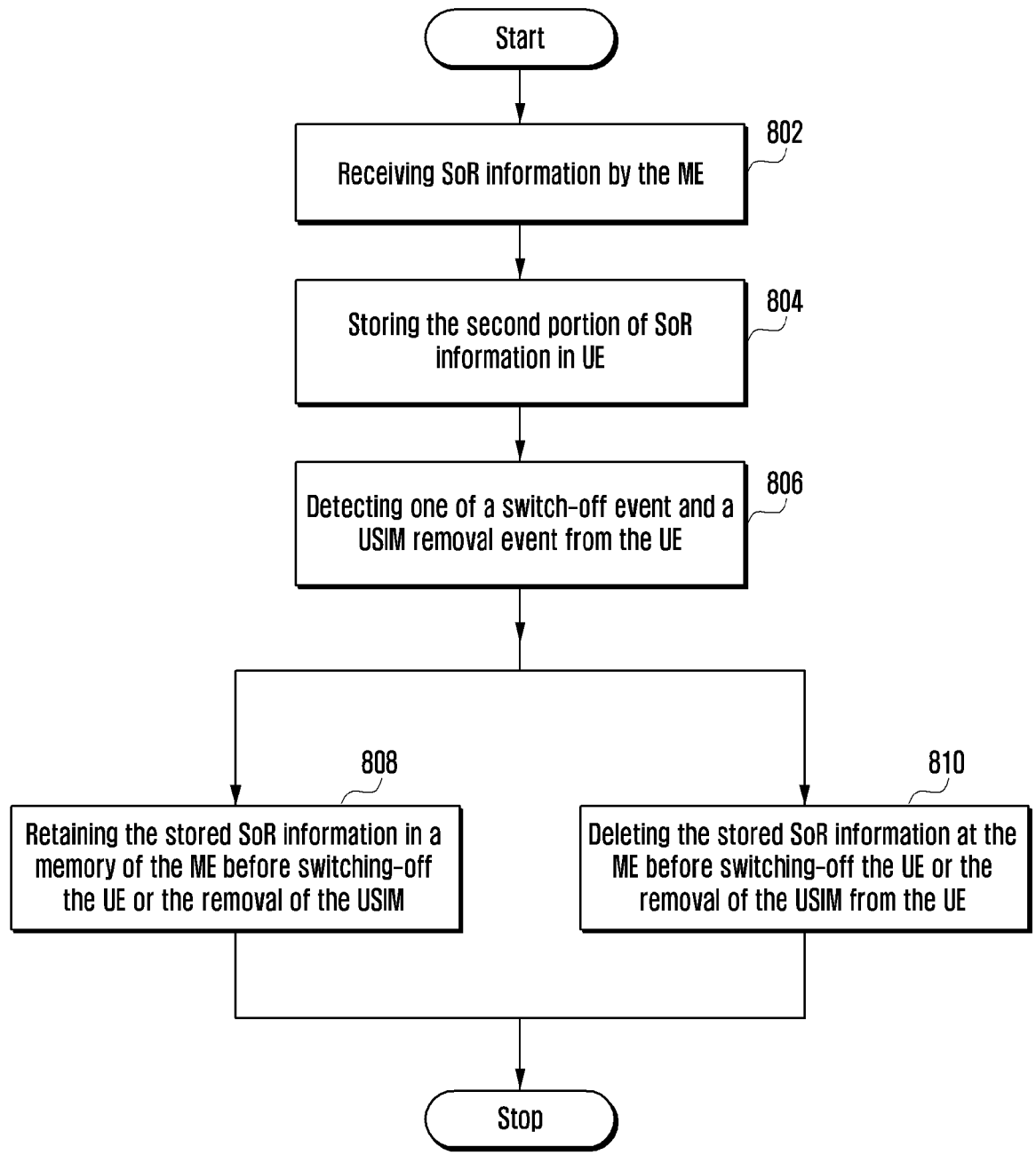

SYSTEM AND METHOD FOR MANAGING SOR INFORMATION IN UE

CROSS-REFERENCE TO RELATED APPLICATIONS

This application is a 371 of International Application No. PCT/KR2019/011593 filed on Sep. 6, 2019, which claims priority to India Patent Application No. 201841033757 filed on Sep. 7, 2018 and India Patent Application No. 201841033757 filed on Sep. 5, 2019, the disclosures of which are herein incorporated by reference in their entirety.

BACKGROUND

1. Field

The present disclosure relates to a wireless communication system and more specifically to a method and system for managing Steering of Roaming (SoR) information in an User Equipment (UE).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 3rd generation partnership project (3GPP) has defined a new control plane (CP) solution to provide support of optimal routing (Steering of Roaming (SoR)) information (or operator preferred public land mobile network (PLMN) list) to the UE in standard TS 23.122.

There are 2 mechanisms to receive the SOR information by the UE from the network:
1. Receiving in the registration accept message or downlink non-access stratum (DL NAS TRANSPORT) message. The registration accept message and DL NAS TRANSPORT may include two mechanisms:
   a) Secure packet—updates the SoR information in a universal mobile telecommunications system (UMTS) subscriber identity module (USIM), and
   b) Mobile equipment (ME) specific list of operator preferred PLMN list—SoR information is updated only in the ME;
2. Using legacy over the air (OTA) mechanisms which updates the SoR information in the USIM.

Thus, receiving the SoR information by receiving the above methods, the UE may end up maintaining two instances of SoR information one in ME and another in USIM. Further proper management of the SoR information is required otherwise the ME may end up camping on non-preferred public land mobile network (PLMN) and end up paying more or losing the revenue.

Thus, it is desired to address the above mentioned problems and at least provide a useful alternative for managing the SoR information received by the UE.

SUMMARY

Accordingly the disclosure provides a method and system for managing Steering of Roaming (SoR) information in a User Equipment (UE). The method comprises receiving, by a ME of the UE the SoR information from a Home Public Land Mobile Network (HPLMN). The SoR information consists of the following HPLMN protected information (see 3GPP TS 33.501): a) an indication of whether the UDM requests an acknowledgement from the UE for successful reception of the steering of roaming information; and b) one of the following: 1) list of preferred PLMN/access technology combinations with an indication that it is included; 2) a secured packet with an indication that it is included; or 3) the HPLMN indication that no change of the Operator Controlled PLMN Selector with Access Technology" list stored in the UE is needed and thus no list of preferred PLMN/access technology combinations is provided.

The method further includes storing by the ME a first portion of the SoR information, the first portion of the SoR information includes an indication whether the OPLMN list is provided to the UE, if provided, whether its provided in the form of secure packet or list of preferred PLMN/access technology combinations, i.e. the first portion indicates whether to store a second portion of the SoR information in the ME or a USIM of the UE and storing, by the ME the second portion of the SoR information in at least one of the ME and the USIM based on the first portion of the SoR information. If "secure packet" is indicated in first portion of the SoR information then UE stores the OPLMN list in the USIM otherwise if the first portion of the SoR information indicates "list of preferred PLMN/access technology combinations" then second portion of the SoR information is stored in the ME. The second portion of the SoR information in this embodiment after removing the security headers is the OPLMN list. The method further includes detecting by the ME one of a switch-off event and a USIM removal event from the UE. The method further retaining the stored second portion of the SoR information in a memory of the ME before switching-off the UE or before the removal of the USIM from the UE in response to determining that the second portion of the SoR information is to be stored in the ME. The method also includes deleting the stored second portion of the SoR information at the ME before switching-off the UE or before the removal of the USIM from the UE, in response to determining that the second portion of the SoR information is to be stored in the USIM. The terms "PLMN ID and access technology list" and "list of preferred PLMN/access technology combinations" can be used interchangeably. The term Universal Subscriber Identity Module (USIM) is an application, this application resides on the UICC. The term USIM and UICC can be used interchangeably in the scope of this embodiment.

The method further comprises detecting, by the ME one of a switch-on event and a USIM insert event in the UE. The method further includes performing by the ME one of: using the stored second portion of the SoR information in the ME after switching-on the UE or after insertion of the USIM in the UE in response to determining that the second portion of the SoR information is to be stored in the ME and using the stored second portion of the SoR information in the USIM by the ME after switching-on the UE or after insertion of the USIM in the UE in response to determining that the second portion of the SoR information is to be stored in the USIM.

In an embodiment, using the stored second portion of the SoR information in the USIM by the ME comprises: requesting, by the ME to the USIM the stored second portion of the SoR information in the USIM. The using further comprises sending, by the USIM to the ME the stored second portion of the SoR information in the USIM and using by the ME the second portion of the SoR information send by the USIM.

In another embodiment, using the stored SoR information in the ME after switching-on the UE or after insertion of the USIM in the UE when the second portion of the SoR information is stored in the ME comprises determining, by the ME whether the inserted USIM is a new USIM or a previous USIM. The using further comprises using the stored second portion of the SoR information in the ME after switching-on the UE or after insertion of the USIM in the UE without synchronizing the ME with the USIM in response to determining that the inserted USIM is the previous USIM and deleting the stored second portion of the SoR information in the ME after switching-on the UE or after insertion of the USIM in the UE in response to determining that the inserted USIM is the new USIM.

In an embodiment the first portion of the SoR information comprises indication of at least one of a list of preferred PLMN with access technology combinations and a secure packet is included and the second portion of the SoR information comprises a Operator Controlled Land Mobile Network (OPLMN) list containing a Public Land Mobile Network Identifier (PLMN ID) and an access technology list.

If the last received steering of roaming information contains the "list of preferred PLMN/access technology combinations" then the ME shall not delete the "Operator Controlled PLMN Selector with Access Technology" list when the UE is switched off. The ME shall delete the "Operator Controlled PLMN Selector with Access Technology" list stored in the ME when a new USIM is inserted. For PLMN selection procedure, at switch-on or recovery from lack of coverage or user reselection, the MS shall use the PLMN/access technology combination in the "Operator Controlled PLMN Selector with Access Technology" stored in the ME, if the last received steering of roaming information contains the "list of preferred PLMN/access technology combinations" and is stored in the ME. Otherwise, the MS shall use the "Operator Controlled PLMN Selector with Access Technology" list retrieved from the SIM.

Accordingly the present disclosure provides a UE for managing SoR information received from a network. The UE comprises the ME, and the USIM. The ME comprises a memory and a processor. The ME is configured to receive SoR information from the network and store a first portion of the SoR information, wherein the first portion indicates whether to store a second portion of the SoR information in a ME or the USIM of the UE. The ME is further configured to store the second portion of the SoR information in at least one of the ME and the USIM based on the first portion of the SoR information. The ME is further configured to detect one of a switch-off event and a USIM removal event from the UE. The ME is further configured to perform one of retain the stored second portion of the SoR information in a memory of the ME before switching-off the UE or before the removal of the USIM from the UE in response to determining that the second portion of the SoR information is to be stored in the ME and delete the stored second portion of the SoR information at the ME before switching-off the UE or before the removal of the USIM from the UE, in response to determining that the second portion of the SoR information is to be stored in the USIM.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

According to the proposed method, the ME is able to determine that the OPLMN list stored is an updated version and thus can efficiently select a PLMN for transmission.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 is a block diagram of a UE for managing SoR information received from the network, according to an embodiment as disclosed herein;

FIG. 2 is a sequence diagram illustrating a Legacy mechanism for receiving and updating OPLMN list in USIM of the UE, according to an embodiment as disclosed in prior art;

FIG. 3 is a sequence diagram illustrating a mechanism in 5G for receiving and updating OPLMN list in USIM of the UE, according to an embodiment as disclosed in prior art;

FIG. 4 is a sequence diagram illustrating a mechanism in 5G for receiving and updating OPLMN list directly in ME of the UE, according to an embodiment as disclosed in prior art;

FIG. 5 is a flow diagram illustrating the method of using SoR information by the UE, according to an embodiment as disclosed in prior art;

FIG. 6 is a sequence diagram illustrating a proposed method for managing SoR information when the UE is switched ON and OFF, according to an embodiment as disclosed herein;

FIG. 7 is a sequence diagram illustrating a proposed method for managing SoR information when the USIM is removed from the UE, according to an embodiment as disclosed herein;

FIG. 8 is a flow diagram illustrating the proposed method for receiving and updating/retaining OPLMN list in ME of the UE, according to an embodiment as disclosed herein;

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provide a method and system for managing Steering of Roaming (SoR) information in a User Equipment (UE).

The principal objective of the embodiments herein is to maintain SoR information in a UE provided by a network. Another objective of the embodiment herein is to store a first portion of the SoR information in the ME. Another objective of the embodiment herein is to store the second portion of the SoR information in at least one of the ME and the USIM. Another object of the embodiment herein is to retain the stored second portion of the SoR information in a memory of the ME before switching-off the UE or before the removal of the USIM from the UE based on a first portion of the SoR information. Another object of the embodiment herein is to delete the stored second portion of the SoR information at the ME before switching-off the UE or before the removal of the USIM from the UE.

The method comprises receiving, by a ME of the UE the SoR information from a Home Public Land Mobile Network (HPLMN). The method further includes storing by the ME a first portion of the SoR information, wherein the first portion indicates whether to store a second portion of the SoR information in the ME or a USIM of the UE and storing, by the ME the second portion of the SoR information in at least one of the ME and the USIM based on the first portion of the SoR information. The method further includes detecting by the ME one of a switch-off event and a USIM removal event from the UE. The method further retaining the stored second portion of the SoR information in a memory of the ME before switching-off the UE or before the removal of the USIM from the UE in response to determining that the second portion of the SoR information is to be stored in the ME. The method also includes deleting the stored second portion of the SoR information at the ME before switching-off the UE or before the removal of the USIM from the UE, in response to determining that the second portion of the SoR information is to be stored in the USIM.

Unlike conventional methods and systems, with the proposed method, the ME is able to determine that the OPLMN list stored is an updated version and thus can efficiently select a PLMN for transmission.

Referring now to the drawings, and more particularly to FIGS. 1 through 8, where similar reference characters denote corresponding features consistently throughout the figures, there are shown preferred embodiments.

FIG. 1 represents a block diagram of a system 100 for managing SoR information in a UE. As seen in FIG. 1 the system comprises a UE 110 and a network 170. The UE 110 can be, for example, but not limited to a cellular phone, a smart phone, a Personal Digital Assistant (PDA), a tablet computer, a laptop computer, a smart social robot, a smart watch, a music player, a video player, an Internet of things (IoT) device or the like. The network 170 may be a 5G wireless network or Evolved Packet Core (EPC). In an embodiment, the network may be a combination of a Home Public Land Mobile network (HPLMN) and a Visited Public Land Mobile Network (VPLMN) network.

The UE 110 comprises a ME 140 and USIM 150. The ME includes a memory 120, and a processor 130. The UE 110 and the network 170 communicate with each other for handling the SoR information in the UE 110, according to an embodiment as disclosed herein. The ME 140 is coupled with the USIM 150 and is responsible for managing SoR information in the UE 110. The SoR information may be divides into two portions a first portion and a second portion. The first portion provides an indication about the information stored in the second portion of the SoR information. The first portion may indicate whether the data in the second portion of the SOR information is a secure packet or a list of preferred PLMN/access technology combinations.

In an embodiment, the ME 140 receives SoR information from the network and stores the first portion of the SoR information in the ME (140). The first portion indicates whether to store the second portion of the SoR information in a ME 140 or the USIM 150 of the UE 110. If the first portion of the SoR information indicates that the second portion is the list of preferred PLMN/access technology combinations, then the ME 140 stores the second portion of the SoR information in the ME 140 itself. If the first portion of the SoR information indicates that the second portion is the secure packet then the ME 140 stores the second portion of the SoR information in the USIM 150.

After storing the first portion of the SoR information, the ME 140, is configured to store the second portion of the SoR information in at least one of the ME 140 and the USIM 150 based on the first portion of the SoR information. In an embodiment the secure packet present in the second portion of the SoR information is stored in the USIM 150. The USIM 150 decrypts the secure data packet to obtain a Operator Preferred Land Mobile Network (OPLMN) list. Based on the OPLMN list, the ME 140 is able to select the desired PLMN for transmission and/or communication.

The ME 140 is further configured to detect one of a switch-off event and a USIM 150 removal event from the UE 110. In an embodiment if the switch-off event of the UE 110 is detected, and if the second portion of the SoR information is the list of preferred PLMN/access technology combinations and is stored in ME 140, then the ME 140 stores the list of preferred PLMN/access technology combinations in a memory of the ME 140.

In another embodiment if the switch-off event of the UE 110 is detected, and if the second portion of the SoR information is the secure packet and is stored in the USIM 150, then the ME 140 deletes a previous list of preferred PLMN/access technology combinations or the OPLMN stored in the ME 140.

In an embodiment, the processor 130 is configured to execute instructions stored in the memory 120 and to perform various processes. The memory 120 stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in Random Access Memory (RAM) or cache).

Although the FIG. 1 shows various hardware components of the UE 100 but it is to be understood that other embodiments are not limited thereon. In other embodiments, the UE 110 may include less or more number of components. Further, the labels or names of the components are used only for illustrative purpose and does not limit the scope of the invention. One or more components can be combined together to perform same or substantially similar function to handle the multi pipe creation in the wireless communication system.

FIG. 2 is a sequence diagram illustrating an example scenario of a Legacy mechanism for receiving and storing OPLMN list in the ME 140 and the USIM 150 of the UE, according to an embodiment as disclosed in prior art. As seen in FIG. 2, at 202, the network 170 sends a short message service (SMS) to the UE 110. The SMS comprises a secure packet consisting SoR Information. The SoR information may be an OPLMN list present in the secure packet. The ME 140 is not able to decode the secure packet received from the network 170 and thus forwards the secure packet to the USIM 150 for decoding the secure packet at 204. At 206, the USIM 150 decodes and/or decrypting the secure packet. After decoding the secure packet, the USIM 150 understands the OPLMN list and saves the OPLMN list in the USIM 150. At 208, the USIM 150 sends a USAT refresh command to the UE 140. The USAT refresh command indicates that the OPLMN list is updated in USIM 150. The USIM 150 also sends the OPLMN list to the ME 140.

In an embodiment the USIM 150 may send any other command indicating updating of the OPLMN list. After receiving the USAT refresh command, the ME 140 stores the OPLMN list and uses the list for selecting a PLMN for transmission at 210.

FIG. 3 is a sequence diagram illustrating a mechanism for receiving and storing OPLMN list in the ME and the USIM of the UE, according to an embodiment as disclosed in prior art. As seen in FIG. 3, at 302, the network 170 sends a DL NAS transport message to the UE 110. The DL NAS transport message comprises a secure packet consisting SoR Information. The SoR information may be an OPLMN list. The DL NAS transport message includes a list type flag which says secure packet. The ME 140 is not able to decode the secure packet received from the network 170 and thus forwards the secure packet to the USIM 150 for decoding the secure packet at 304. At 306, the USIM 150 decodes and/or decrypting the secure packet. After decoding the secure packet, the USIM 150 understands the OPLMN list and saves the OPLMN list in the USIM 150. At 308, the USIM 150 sends a USAT refresh command to the UE 140. The USAT refresh command indicates that the OPLMN list is updated in USIM 150. The USIM 150 also sends the OPLMN list to the ME 140.

In an embodiment the USIM 150 may send any other command indicating updating of the OPLMN list. After receiving the USAT refresh command, the ME 140 stores the OPLMN list and uses the list for selecting a PLMN for transmission at 310.

FIG. 4 is a sequence diagram illustrating a mechanism for receiving and storing OPLMN list in one of the ME of the UE, according to an embodiment as disclosed in prior art.

As seen in FIG. 4, at 402, the network 170 sends a DL NAS transport message to the UE 110. The DL NAS transport message comprises a secure packet consisting SoR Information. The SoR information may be an OPLMN list. The DL NAS transport message includes a list type flag which discloses a PLMN ID and an access technology list. The ME 140 at 404, directly gets the OPLMN list from the network 170. At 406, the ME 140 stores the latest received OPMN list and uses the list for PLMN selection process.

In an embodiment the mechanism illustrated in FIG. 2-FIG. 4 and described in the specification above provides various methods for storing the OPLMN list in the ME 140 of the UE 110. The UE 110 may use any of the above methods at any time for selecting the PLMN for transmission.

FIG. 5 is a flow diagram illustrating a scenario where the UE 110 ends up camping on noon-preferred PLMN. Using the mechanisms for storing the OPLMN list (also termed as list in the disclosure) as discussed above, it is possible to have two SoR lists (OPLMN list) within a UE 110. The network 170 may provide the list to the ME 140 or to the SIM 150 directly. Out of the two SoR list one may be in ME 140 and other in USIM 150. The list in the ME 140 may be provided by the network 170; however the list in the USIM 150 may be provided either by the network or may be pre-configured. If two list are available and if the UE 110 does power-off and power-on (in the Visited public land mobile network (PLMN)), then if the latest list is with ME 140, then the UE 100 will lose the list stored in the ME 140 and will get the old list from the USIM 150, which is a non-preferred list.

Further, during power-off, the list stored in the ME 140 is deleted and during power-on, the ME 140 reads the list from the USIM 150. Such scenario leads to use of wrong PLMN list, even though the network provides the new list via SoR information mechanism. FIG. 5 explained the above scenario through flow diagram 500. As seen in FIG. 5 at 502, the ME 140 receives the SoR information comprising OPLMN list for PLMN selection. The SoR information may be received by the ME 140 through a registration accept message or a DL NAS transport message. After receiving the SoR information at 504, the UE 110 performs power on and power OFF. As per legacy the UE 110 deletes the OPLMN list before power OFF. Further after power ON, the ME 140 takes the OPLMN list from the USIM 150 at 506. However, the ME 140 is not aware whether the list present in the USIM 150 is updated or not. Thus, if the list in not updated, then the UE 110 selects a non-preferred PLMN at 508.

To avoid the problems mentioned above, the proposed method provides an efficient method of selecting the PLMN by allowing the ME 140 to know whether the ME 140 has the updated list or not in different scenarios.

FIG. 6 is a sequence diagram, illustrating the proposed method for selecting PLMN during power OFF and ON of the UE 110. As seen in fig. at 602, the network 170 sends a registration accept message to the ME 140. The network 170 may also send the DL NAS transport message. The registration accept message comprises the SoR information comprising the first portion and the second portion. At 604, the ME 140 stores the first portion of the SoR information and the second portion of the SoR information. As seen in FIG. 6 the first portion indicates that the second portion comprises the list of preferred PLMN/access technology combinations and hence the second portion is also stored in the ME 140. The list of preferred PLMN/access technology combinations comprises a PLMN identifier (PLMN ID) and the access technology information for selection of PLMN by the ME 140. At 606, the ME 140 selects the PLMN for transmission using the stored list of preferred PLMN/access technology combinations. At 608, the UE 110 is switched off. However, before switching OFF, the UE 110 again checks the contents of the first portion of the SoR information and based on the contents of the first portion of the SoR information, the ME 140 either stores the list or deletes the list. At 610, the UE 110 is powered ON. After powering on the UE 110 checks whether the list is available in the ME 140. If the list is available in the UE 110, then the ME 140 uses the stored list for PLMN selection and ignores the PLMN list received from the USIM 150. Thus using the proposed method the ME 140 uses the updated list for PLMN selection and saves revenue loss.

FIG. 7 is a sequence diagram, illustrating the proposed method for selecting PLMN during power OFF and ON of the UE 110. As seen in FIG. 7 at 702, the ME 140 receives SoR information from the network in form of a secure packet. As seen in 704, the ME 140 is not able to decrypt the data packet. The ME 140 stores a first portion of the SoR information. At 706, the ME 140, send a second portion of the SoR information to the USIM 150. At 708, the USIM 150 decrypts the second information to obtain a OPLMN list. At 710, the USIM 150 sends the OPLMN list to the ME 140. At 712, the ME 140 uses the received OPLMN list and selects the PLMN for transmission.

At 714, the UE 110 is switched off. Before switching off the ME 140 checks first portion of the SoR information, which indicates that information about storing the OPLMN list. Based on the first portion of information the ME 140 deletes the OPLMN list present in the UE. the At 716 the UE 100 is switched ON. After switching on, the UE 110 checks whether the OPLMN list available in ME 140. If the OPLMN 140 list is not available then at 718, the ME 140 requests the USIM 150 to provide the OPLMN list. At 720, the USIM 150 provides the OPLMN list to the ME 140. At 722, the ME 140 selects the PLMN for transmission based on the OPLMN list received from the USIM 150.

FIG. 8 is a flow diagram illustrating a flow of the proposed method for handling SoR information in the UE 110 and selecting a PLMN based on the SoR information, according to an embodiment as disclosed herein. As seen in FIG. 8 at 802, the ME 140 of the UE 110 receives the SoR information from a Home Public Land Mobile Network (HPLMN) (network 170). The SoR information comprises a first portion and a second portion. In an embodiment the first portion is an information element of the SoR information. The first portion may also be an indication informing that whether the SoR information comprises the PLMN/access technology combination list or the secure packet.

At 804, the UE 110 stores the first portion of the SoR information. At 806, the second portion of the SoR information is stored by the UE in at least one of the ME 140 and the USIM 150. In an embodiment if the first portion of the SoR information indicates that the SoR information comprises PLMN/access technology combination list, then the UE 100 stores the second portion of the SoR information in the ME 140. In another embodiment, if the first portion of the SoR information indicates that the SoR information comprises the secure packet, then the UE 100 stores the second portion of the SoR information in the USIM 150.

At 806, after storing the second portion of the SoR information in at least one of the ME 140 and the USIM 150, the UE 100 detects one of a switch-OFF event and a USIM 150 removal event form the UE 110. The Switch OFF event indicates switching off the UE 110. The USIM removal indicates removing the USIM 150 from the UE 110.

After detecting one of the Switch OFF event and the USIM event removal the flow 800 proceeds either to 808 or to 810. If the first portion of the SoR information determines that the SoR information is to be stored in the ME then the UE 110 at 808 retains the SoR information stored in the ME 140 in a memory of the ME 140 before switching OFF the UE 110 or before removing the USIM 150 from the UE 110.

If the first portion of the SoR information determines that the SoR information is to be stored in the USIM 150 then the UE 110 at 810 deletes the SoR information stored in the ME 140 in a memory of the ME 140 before switching OFF the UE 110 or before removing the USIM 150 from the UE 110.

Further in an embodiment after switching ON, the UE 110 the UE uses the retained information in the ME 140 for selecting the PLMN for transmission.

In another embodiment, if the ME 140 deletes the SoR information before power OFF then after power ON, the UE 110 requests the USIM 150 for providing the SoR information. The USIM 150 provides the Sor information to the ME 140 in response to the request. After receiving the SoR information, the ME 140 selects a PLMN for transmission based on the received SoR information.

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements shown in FIGS. 1-8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A user equipment (UE) in a communication system, the UE comprising:
 a universal subscriber identity module (USIM); and
 a mobile equipment (ME) comprising a processor configured to:
  receive steering of roaming (SoR) information including one of first type information and second type information from a network;
  identify whether the SoR information includes the first type information or the second type information;
  store information on combinations of a public land mobile network (PLMN) and an access technology included in the first type information in the ME, in case the SoR information includes the first type information; and
  select a combination of the PLMN and the access technology, based on the information stored in the ME,
 wherein the information stored in the ME is not deleted from the ME when the UE is switched off.

2. The UE of claim 1, wherein the first type information includes the information on combinations of the PLMN and the access technology to be stored in the ME and corresponding first indication, and
 wherein the second type information includes a secured packet including the information on combinations of the PLMN and the access technology to be stored in the USIM and corresponding second indication.

3. The UE of claim 1, wherein the UE is further configured to:
 store information on combinations of the PLMN and the access technology included in the second type information in the USIM, in case the SoR information includes the second type information; and
 select a combination of the PLMN and the access technology, based on the information stored in the USIM.

4. The UE of claim 1, wherein the information stored in the ME is deleted from the ME when a new USIM is inserted to the UE.

5. A method performed by a user equipment (UE) in a communication system, the method comprising:
 receiving steering of roaming (SoR) information including one of first type information and second type information from a network;
 identifying whether the SoR information includes first type information or second type information;
 storing information on combinations of a public land mobile network (PLMN) and an access technology included in the first type information in mobile equipment (ME), in case the SoR information includes the first type information; and
 selecting a combination of the PLMN and the access technology, based on the information stored in the ME,
 wherein the information stored in the ME is not deleted from the ME when the UE is switched off.

6. The method of claim 5, wherein the first type information includes the information on combinations of the PLMN and the access technology to be stored in the ME and corresponding first indication, and
 wherein the second type information includes a secured packet including the information on combinations of the PLMN and the access technology to be stored in a universal subscriber identity module (USIM) and corresponding second indication.

7. The method of claim 5, further comprising:
 storing information on combinations of the PLMN and the access technology included in the second type information in a universal subscriber identity module (USIM), in case the SoR information includes the second type information; and
 selecting a combination of the PLMN and the access technology, based on the information stored in the USIM.

8. The method of claim 5, wherein the information stored in the ME is deleted from the ME when a new universal subscriber identity module (USIM) is inserted to the UE.

9. A network in a communication system, the network comprising:
 a transceiver; and
 a processor configured to transmit steering of roaming (SoR) information including one of first type information and second type information to a user equipment (UE),
 wherein information on combinations of a public land mobile network (PLMN) and an access technology included in the first type information is stored in a mobile equipment (ME) of the UE, in case the SoR information includes the first type information, and
wherein a combination of the PLMN and the access technology is selected by the UE based on the information stored in the ME,
wherein the information stored in the ME is not deleted from the ME when the UE is switched off.

10. The network of claim 9, wherein the first type information includes the information on combinations of the PLMN and the access technology to be stored in the ME and corresponding first indication; and
wherein the second type information includes a secured packet including the information on combinations of the PLMN and the access technology to be stored in a universal subscriber identity module (USIM) and corresponding second indication.

11. The network of claim 9, wherein information on combinations of the PLMN and the access technology included in the second type information is stored in a universal subscriber identity module (USIM) of the UE, in case the SoR information includes the second type information, and
wherein a combination of the PLMN and the access technology is selected by the UE based on the information stored in the USIM.

12. A method performed by a network in a communication system, the method comprising:
transmitting steering of roaming (SoR) information including one of first type information and second type information to a user equipment (UE),
wherein information on combinations of a public land mobile network (PLMN) and an access technology included in the first type information is stored in a mobile equipment (ME) of the UE, in case the SoR information includes the first type information, and
wherein a combination of the PLMN and the access technology is selected by the UE based on the information stored in the ME,
wherein the information stored in the ME is not deleted from the ME when the UE is switched off.

13. The method of claim 12, wherein the first type information includes the information on combinations of the PLMN and the access technology to be stored in the ME and corresponding first indication; and
wherein the second type information includes a secured packet including the information on combinations of the PLMN and the access technology to be stored in a universal subscriber identity module (USIM) and corresponding second indication.

* * * * *